(12) United States Patent
Stemmler et al.

(10) Patent No.: US 6,288,915 B1
(45) Date of Patent: Sep. 11, 2001

(54) CONVERTER CIRCUIT ARRANGEMENT HAVING A DC INTERMEDIATE CIRCUIT

(75) Inventors: Christoph Stemmler, Baden; Christian Stulz, Zürich, both of (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/581,942

(22) PCT Filed: Dec. 9, 1997

(86) PCT No.: PCT/CH98/00520

§ 371 Date: Aug. 11, 2000

§ 102(e) Date: Aug. 11, 2000

(87) PCT Pub. No.: WO99/34500

PCT Pub. Date: Jul. 8, 1999

(30) Foreign Application Priority Data

Dec. 23, 1997 (DE) .............................. 197 57 452

(51) Int. Cl.[7] .............. H02J 3/00; H02M 5/40; H02M 5/45
(52) U.S. Cl. .................. 363/34; 363/37; 363/48
(58) Field of Search .................. 63/34, 35, 37, 63/40, 44, 47, 48

(56) References Cited

U.S. PATENT DOCUMENTS 5,187,651 * 2/1993 Ekstrom ........................... 363/35
5,414,612 * 5/1995 Bjorklund et al. .................. 363/35
5,621,628 * 4/1997 Miyazaki et al. ................... 363/37

FOREIGN PATENT DOCUMENTS

| 2212484 | 9/1972 | (DE) | H02M/7/48 |
| 19607201A1 | 8/1996 | (DE) | H02M/1/12 |
| 0 135 830 | 4/1985 | (EP) | H02M/5/45 |

OTHER PUBLICATIONS

German Search Report and partial English language translation. Mar. 24, 2000.

* cited by examiner

*Primary Examiner*—Peter S. Wong
*Assistant Examiner*—Bao Q. Vu
(74) *Attorney, Agent, or Firm*—Burns, Doane, Swecker & Mathis, L.L.P.

(57) ABSTRACT

A converter circuit arrangement having a DC intermediate circuit (3) includes a transformer (8) having at least two windings (9 and 10). This transformer (8) is connected in the intermediate circuit (3) such that the undesirable, unbalanced current components lead to magnetization of the transformer core and are thus reduced. A grounded LC filter (Lf, Cf) is connected upstream of the load (6) and produces a sinusoidal voltage across the load (6). In consequence, the circuit can be used with any desired rotating-field machines, and thus also for retrofitting existing systems.

3 Claims, 3 Drawing Sheets

CONVERTER CIRCUIT ARRANGEMENT HAVING A DC INTERMEDIATE CIRCUIT

FIELD OF THE INVENTION

The invention relates to the field of power electronics, and more specifically a converter circuit arrangement.

BACKGROUND OF THE INVENTION

Converter circuit arrangements of this generic type are described, for example, in European Patent Applications EP 0 682 402 and EP 0 758 161, as well as in German Laid-Open Specification DE 196 07 201 A1. Such a converter circuit arrangement has a first converter, which can be connected, preferably via a transformer, to a three-phase voltage supply network. The first converter converts the AC voltage into a DC voltage but, at the same time, can also allow power to flow in both directions. The DC voltage supplies a DC intermediate circuit, which is essentially formed by a capacitor bank. The DC intermediate circuit is connected to a second converter which drives a load, for example a motor. The motor is, in particular, a rotating-field machine. Nowadays, frequency converters with a DC intermediate circuit (U converters) are generally used for driving rotating-field machines. Owing to the principle on which they operate, in addition to the desired balanced three-phase voltage, such converters also always produce an undesirable, but unavoidable, unbalanced, so-called common-mode voltage. This common-mode voltage produces a ground current, which is caused by the fact that the parasitic capacitances between the converter and ground (primarily caused by shielded cables) are continually harged and discharged by the common-mode voltage. The round current path is formed by: converter—ground point—ground conductor system—parasitic ground capacitances—converter. Modern systems are designed to have losses that are as low as possible. This therefore, of course, also applies to the ground current and leads to an oscillation being excited in the ground current path, and the current reaching a considerable amplitude. This represents a large additional load on the converter components. Furthermore, the superimposition of the ground current spikes on the balanced current triggers overcurrent protection thresholds. In order to avoid this, the entire converter would have to be highly overdesigned. In the past, this was not a problem since the semiconductor switches switched only very slowly, so that the additional losses were only minor. However, the problem has been exacerbated as the switching frequency and the switching flank gradient have increased. Thus, with the high switching frequencies that are possible nowadays, technical measures are required to attenuate the common-mode voltage. For this reason, in DE 196 07 201 A1, an interference protection filter is introduced into the intermediate circuit. The filter comprises a transformer and a set of filter capacitors. One winding of the transformer is connected in the positive path of the intermediate circuit, and the other in the negative path of the intermediate circuit, so that the unbalanced ground current magnetizes the transformer core, and the ground current is thus reduced.

The described converter arrangement is particularly suitable for applications in the low-voltage range, that is to say with rated voltages below 1 kV. It has the disadvantage that, in consequence, it is not possible to drive all types of rotating-field machines: The switching processes in the second converter lead to non-sinusoidal voltages at the motor terminals and, owing to the capacitive grounding via the filter capacitors, the common-mode voltage leads to voltage spikes between the motor and ground. In consequence, more complex motor designs are required, which can also be used with non-sinusoidal voltages.

SUMMARY OF THE INVENTION

Accordingly, one object of the invention is to provide a novel converter circuit arrangement which also makes it possible to feed standard motors, for example those which require a sinusoidal terminal voltage. Furthermore, it is intended to be possible to use the circuit in the medium- and high-voltage range.

This object is achieved by a converter circuit arrangement having the features of the independent claim.

According to the invention, this is achieved by a filter having a grounded star point, and which is connected between the second converter and the load. This results in a sinusoidal voltage across the load, allowing any desired rotating-field machines to be supplied.

In consequence, the converter arrangement according to the invention can also be used to retrofit existing systems, since there is no need to replace the existing machines. Such an addition of a converter system allows significant energy savings in that, for example, the drives can be operated at a variable speed.

A transformer having at least two windings is arranged in the intermediate circuit. One winding is connected in the positive path, and the other in the negative path. The windings are magnetically coupled to one another and are connected in parallel. This measure affects only the undesirable, unbalanced current components which flow in the same direction in both windings. In consequence, the core of the transformer is magnetized, and the common-mode currents are reduced. The desired, balanced current components, which flow in one direction in one winding and in the opposite direction to the second winding, are scarcely affected.

The transformer can also be connected in the current paths between the supply and the first converter, or in the current paths between the second converter and the load.

A preferred exemplary embodiment, in which the transformer can be designed more economically, is distinguished by the fact that a third winding is provided, which is likewise mechanically coupled to the first two windings, and to which an attenuating resistor is connected. The voltage induced by this in the third winding by the common-mode currents is dissipated in the resistor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

A DETAILED DESCRIPTION OF THE INVENTION

Figure 1:
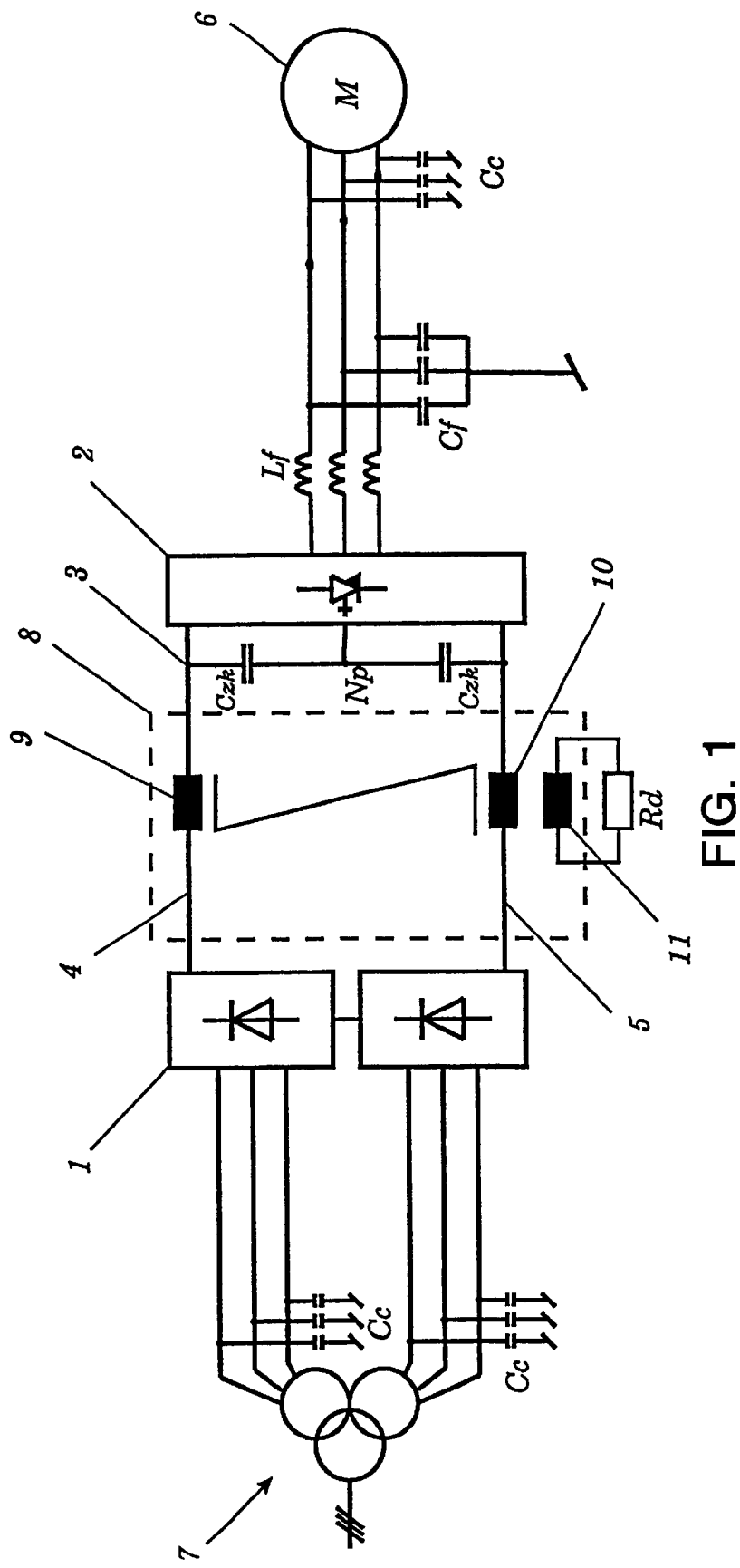
FIG. 1 shows a schematic illustration of a preferred exemplary embodiment.

Referring now to the drawings, wherein like reference numerals designate identical or corresponding parts throughout the several views, one exemplary embodiment of the invention is shown schematically in FIG. 1. 7 denotes a three-phase voltage supply network which is connected via a mains transformer to a first converter 1. The three-phase shielded connecting cables form cable inductances and cable capacitances Cc, which are not shown. The AC voltage of the voltage supply network 7 is converted into DC voltage in the converter 1. A DC intermediate circuit 3 comprises intermediate circuit capacitors Czk, which are connected to a positive path 4 and to a negative path 5. The intermediate circuit 3 is connected to a second converter 2, which converts the DC voltage back to an AC voltage of variable frequency and amplitude.

In the exemplary embodiment shown, the second converter 2 is a three-point inverter. In consequence, two series-connected intermediate circuit capacitors Czk are also provided, which form a neutral point Np at their common junction point. The converter 2 drives a load 6, for example a variable speed motor M. The connecting cables between the load 6 and the converter 2 once again form cable capacitances Cc and cable inductances, which are not shown. According to the invention, an LC filter having a filter capacitance Cf and a filter inductance Lf is arranged between the load 6 and the converter 2.

A transformer 8 is arranged in the intermediate circuit. The transformer has at least two windings, a first winding 9 being arranged in the positive path 4, and a second winding 10 being arranged in the negative path 5. The circuit operates as follows: the LC filter filters out the harmonics from the inverter voltage that is produced, so that only the balanced sinusoidal voltage is now applied to the motor. The motor is not heated by the harmonics, so that the drive power need not be reduced. However, in practice, the LC filter acts only on balanced (3-phase) harmonics. Unbalanced harmonics (of the same phase or common-mode voltage harmonics) are scarcely affected. The filter star point is hard-grounded. This results on the one hand in no common-mode voltage being applied to the motor (a further precondition for being able to use standard motors). On the other hand, however, the unavoidable common-mode voltage is dropped between the remaining parts of the circuit arrangement (converter 1, intermediate circuit, converter 2, transformer cable, secondary winding of the transformer) and ground. In consequence, the charges on the ground capacitances are reversed at the frequency of the common-mode voltage, and the undesirable ground current mentioned initially flows.

The balanced load current flows in one direction in the first winding 9 in the transformer 8, and in the opposite direction in the second winding 10. In consequence, the core of the transformer 8 is not magnetized. The load current therefore does not see the transformer 8 at all. The unbalanced ground current, in contrast, always flows in the same direction in the two windings 9 and 10. In consequence, the transformer core is magnetized, and the ground current is effectively reduced. If it has only two windings, the transformer 8 is uneconomically large. For this reason, a third winding 11 is preferably provided, and is terminated via an attenuating resistor Rd. The ground current thus induces a voltage in the attenuating resistor Rd, which voltage is dissipated. This effectively attenuates the undesirable, unbalanced common-mode current.

However, the transformer 8 also has a second advantageous function: it acts as a short-circuit current limiter in the event of a fault. If a diode in the converter 1 fails, then the intermediate circuit capacitor Czk discharges itself via the defective rectifier. The short-circuit current resulting from this exerts very large forces on the busbar system and, furthermore, can damage the intermediate circuit capacitor Czk. The stray inductance in the transformer 8 limits this current to an acceptable level.

Figure 2:
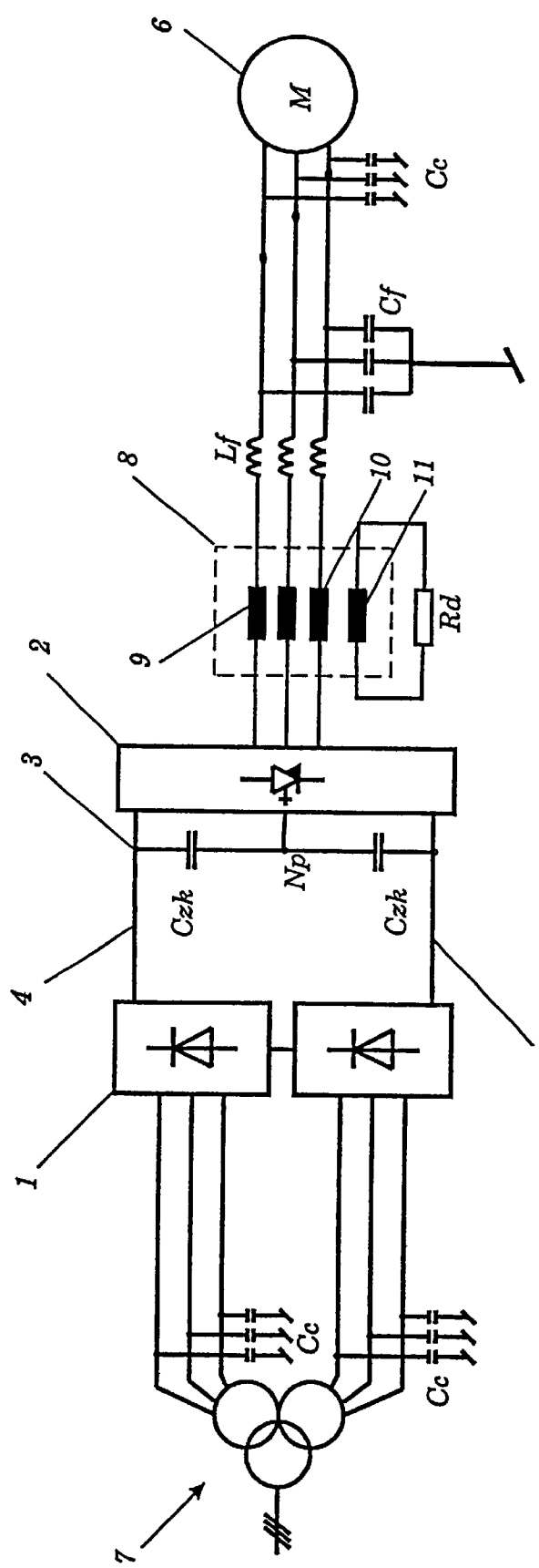
FIG. 2 shows a schematic illustration of a second embodiment.

FIG. 2 shows an exemplary embodiment in which the transformer 8 is connected between the load 6 and the second converter 2. In the three-phase application shown, the transformer 8 has three primary windings (9, 10) and a third winding 11 which, once again, can be terminated by an attenuating resistor Rd.

Figure 3:
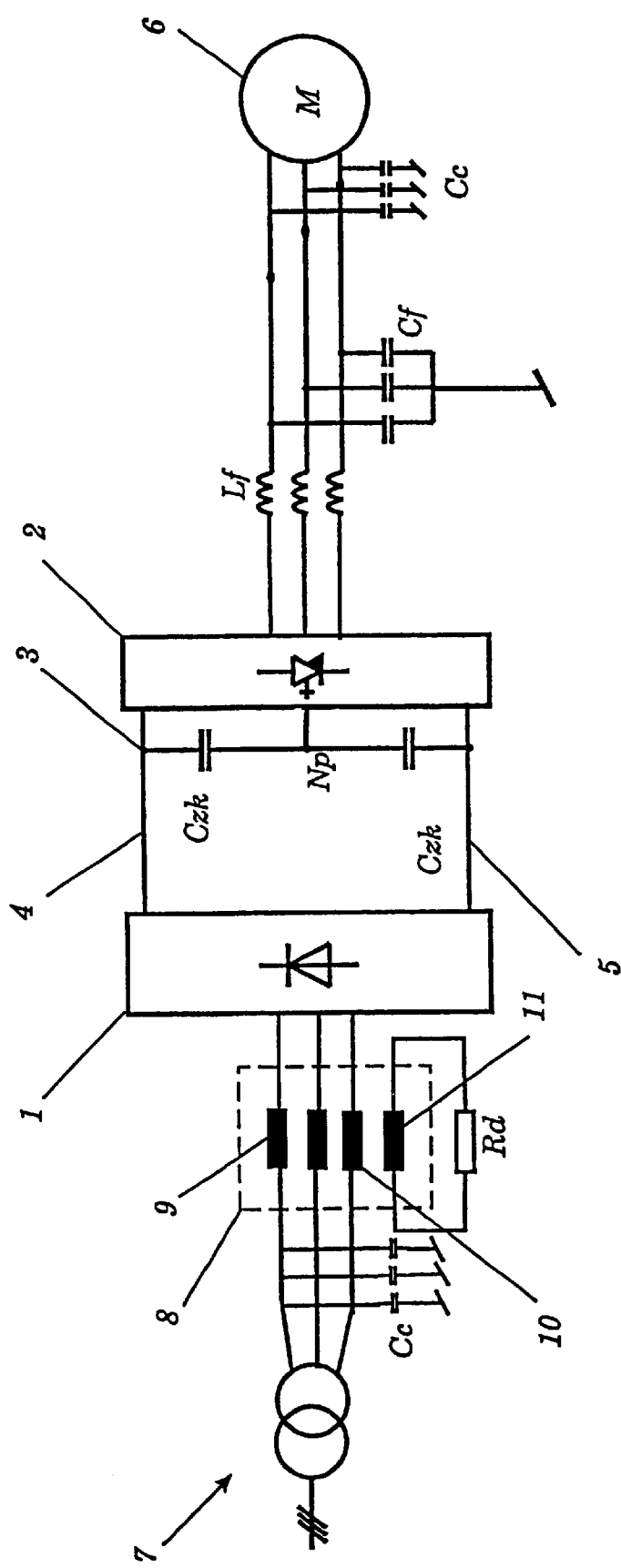
FIG. 3 shows a schematic illustration of a third embodiment.

Finally, FIG. 3 also shows an exemplary embodiment in which the transformer 8 is arranged between the voltage supply network 7 and the first converter 1.

The invention has been explained above using the example of a three-point inverter and an LC filter. However, this is not essential for the purposes of the invention. The only important factor is that the invention relates to a converter having a DC intermediate circuit. Other embodiments, such as two-point inverters or multi-level converters are likewise possible for the purposes of the invention.

Obviously, numerous modifications and variations of the present invention are possible in the light of the above teachings. It is therefore to be understood that, within the scope of the appended claims, the invention may be practiced otherwise than as specifically described herein.

What is claimed is:

1. A converter circuit arrangement comprising:
    (a) a first converter which is connected to a voltage supply network by conductors;
    (b) a second converter which is connected to a load by conductors;
    (c) a DC intermediate circuit having a positive path and having a negative path, via which intermediate circuit the first converter is connected to the second converter;
    (d) a transformer having at least first, second and third windings which are magnetically coupled to one another,
    one of the first and second windings being inserted into each one of the conductors between the voltage supply network and the first converter, or
    the first winding being inserted into the positive path and the second winding being inserted into the negative path of the intermediate circuit, or
    one of the first and second windings being inserted into each one of the conductors between the second converter and the load,
    the third winding being magnetically coupled to the first and second windings and being terminated by an attenuating resistor; and (e) a grounded LC filter having filter inductances and filter capacitors, the grounded LC filter being connected between the load and the second converter, wherein the filter inductances are inserted in the conductors between the second converter and the load and the filter capacitances are inserted between a) the conductors between the second converter and the load and b) a common ground.

2. The converter circuit arrangement as claimed in claim 1, wherein the windings of the transformer are oriented in parallel, so that a current flowing in one winding in the direction of the load produces the same transformer magnetization direction as a current flowing in another winding in the direction of the load.

3. The converter circuit arrangement as claimed in claim 1, wherein the second converter has a three-point inverter topology, and a neutral point is formed by two internediate-circuit capacitors which are connected in series between the positive path and the negative path.

* * * * *